(12) United States Patent
Sauve et al.

(10) Patent No.: US 8,885,960 B2
(45) Date of Patent: Nov. 11, 2014

(54) LINKING PHOTOGRAPHS VIA FACE, TIME, AND LOCATION

(75) Inventors: Aaron J. Sauve, Seattle, WA (US); Jannes Paul Peters, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 340 days.

(21) Appl. No.: 13/253,399

(22) Filed: Oct. 5, 2011

(65) Prior Publication Data

US 2013/0089243 A1   Apr. 11, 2013

(51) Int. Cl.
*G06K 9/68* (2006.01)
*G06F 17/30* (2006.01)
*G06T 11/00* (2006.01)

(52) U.S. Cl.
CPC ............ *G06K 9/68* (2013.01); *G06F 17/30038* (2013.01); *G06F 17/30244* (2013.01); *G06T 11/00* (2013.01)
USPC ....................................................... 382/244

(58) Field of Classification Search
None
See application file for complete search history.

(56) References Cited

U.S. PATENT DOCUMENTS

| | | | |
|---|---|---|---|
| 6,453,361 B1 | 9/2002 | Morris | |
| 7,903,904 B1 | 3/2011 | Loeb et al. | |
| 8,275,733 B2 * | 9/2012 | McCullough et al. | 706/47 |
| 2004/0264810 A1 * | 12/2004 | Taugher et al. | 382/305 |
| 2008/0276177 A1 * | 11/2008 | Sauve | 715/733 |
| 2008/0282174 A1 * | 11/2008 | Sauve et al. | 715/748 |
| 2009/0192967 A1 | 7/2009 | Luo et al. | |
| 2009/0327432 A1 | 12/2009 | Augustine et al. | |
| 2010/0217989 A1 * | 8/2010 | Sauve et al. | 713/175 |
| 2011/0022529 A1 | 1/2011 | Barsoba et al. | |
| 2011/0038512 A1 | 2/2011 | Petrou et al. | |
| 2011/0064281 A1 | 3/2011 | Chan | |
| 2011/0072376 A1 * | 3/2011 | Moore et al. | 715/765 |
| 2012/0060105 A1 * | 3/2012 | Brown et al. | 715/753 |

OTHER PUBLICATIONS

Allen, Jennifer, "View Local Instagram Photos With Instabam", Retrieved at: http://www.148apps.com/news/view-local-instagram-photos-instabam/, May 24, 2011, 11 pages.

* cited by examiner

*Primary Examiner* — Vikkram Bali
(74) *Attorney, Agent, or Firm* — Bryan Webster; Peter Taylor; Micky Minhas

(57) ABSTRACT

The subject disclosure is directed towards a technology in which metadata such as time, location and/or people identity data, and/or tag or album data that is associated with a photograph or other content may be used to serendipitously discover related content, from among many possible sources. The related content may be from any local or remote source, such as uploaded by multiple contributors corresponding to content captured during a social event, and may be presented in an integrated view in conjunction with a local photograph or other content. Different views of content and related content are automatically constructed from the metadata, providing different user experiences/scenarios without manual collection of the photos. Also described are notifications of newly detected related content, and face detection and recognition to obtain additional metadata.

20 Claims, 10 Drawing Sheets

LINKING PHOTOGRAPHS VIA FACE, TIME, AND LOCATION

BACKGROUND

With the popularity of digital photography and video, people are able to have large amounts of photographs ("photos") and videos (content) maintained on electronic devices such as smartphones, tablets, and personal computers. People and other entities are also able to upload such content to various sites, where friends and others (if the photos an/or videos are made public) are able to access them.

People primarily browse photos via individual photos, albums of photos that they have arranged, or tag sets corresponding to specifically tagged photos. Photo albums are good at describing an event from one participant's perspective, e.g., pictures of a vacation. Tags sets are very good at describing people, such as to tag each photo containing a particular person so that those photos can be quickly accessed from among a large collection.

While albums and tag sets work well to an extent, they are somewhat limited and can be labor-intensive to put together, and to maintain as new photos become available. Moreover, in many situations such as a social event, the photos from that event are spread across multiple services, sent in multiple ways, and posted by multiple people, whereby getting the photos that are related to the event can be very difficult. Any technology that helps users browse photos, including to easily view photos in other scenarios, is desirable.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, various aspects of the subject matter described herein are directed towards a technology by which metadata associated with content such as a photograph is used to automatically relate that content to other content. The other, related content may be obtained from multiple services, posted by multiple people or other entities, and is independent of how that other content was sent. Once the related content is known, an integrated view that presents the other, related content in conjunction with the content (e.g., photograph) may be constructed and output on a device, e.g., for user interaction.

In one aspect, the metadata may be automatically generated, such as time and location data associated with the photograph, which is matched with time and location data associated with the related content. The metadata also (or alternatively) may comprise identity metadata corresponding to at least one person in the photograph. Such metadata may be obtained by providing the photograph to a face detection mechanism to obtain face-related data, and providing the face-related data to a recognition service. Manually entered time, location and/or identity data, such as if not automatically generated, may be similarly used to match related content, as may other manually added information such as album name, photo or video title, and so on.

In one aspect, the photograph may comprise a local photograph that is maintained on device storage, with the related content accessed at least in part from a remote source. Example remote sources include web content and social network content, e.g., posted by friends. Related content may also be obtained via messages, e.g., as attachments to email or text messages.

In one aspect, the technology described herein also may output a notification with respect to local content when new related content is determined to exist. For example, a notification may appear on a tile, such as an album representation, to indicate that the album contains or is linked to the new related content.

Various views may be provided, including a camera roll containing one or more photos and at least one interactive component (e.g., an album or other collection representation) that is representative of a collection of content related to the one or more photos. Note that as used herein, "album" is not limited to manually assembled collections as is conventional, but also includes collections assembled based on the technology described herein. A camera roll view also may contain one or more photos, along with possibly one or more interactive components that are each representative of a video or album related to the one or more photos. Other views include an album view, or a view that separates a first set of content (e.g., the user's own content) from a second set of content (e.g., content from remote sources) for display.

Other advantages may become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which.

DETAILED DESCRIPTION

Various aspects of the technology described herein are generally directed towards a technology in which photos (or like content such as videos) having associated metadata may be accessed via serendipitous discovery of interesting related other content (e.g., other photos) via their metadata. The technology described herein also facilitates ways to share photos and other content that are desirable to users.

As exemplified herein, a photo with associated metadata may be considered a way to link together a set of related content/photos based upon their associated metadata. Time, location, and/or one or more people (identity data) are examples of metadata that may be used to link together related photos. Moreover, via the metadata, linked photos may be shared as an experience among multiple people, including when taken by more than one photographer, and may be integrated from multiple data stores, services, social networks, the web and so forth. Moreover, the metadata may be used to provide notifications to a user, e.g., when a friend posts a related photo on a social network site, the user may be notified of the posting.

It should be understood that any of the examples herein are non-limiting. For example, videos and other content may benefit from the technology described herein. As such, the present invention is not limited to any particular embodiments, aspects, concepts, structures, functionalities or examples described herein. Rather, any of the embodiments, aspects, concepts, structures, functionalities or examples described herein are non-limiting, and the present invention may be used various ways that provide benefits and advantages in computing, mobile devices and/or user experiences in general.

Figure 1:
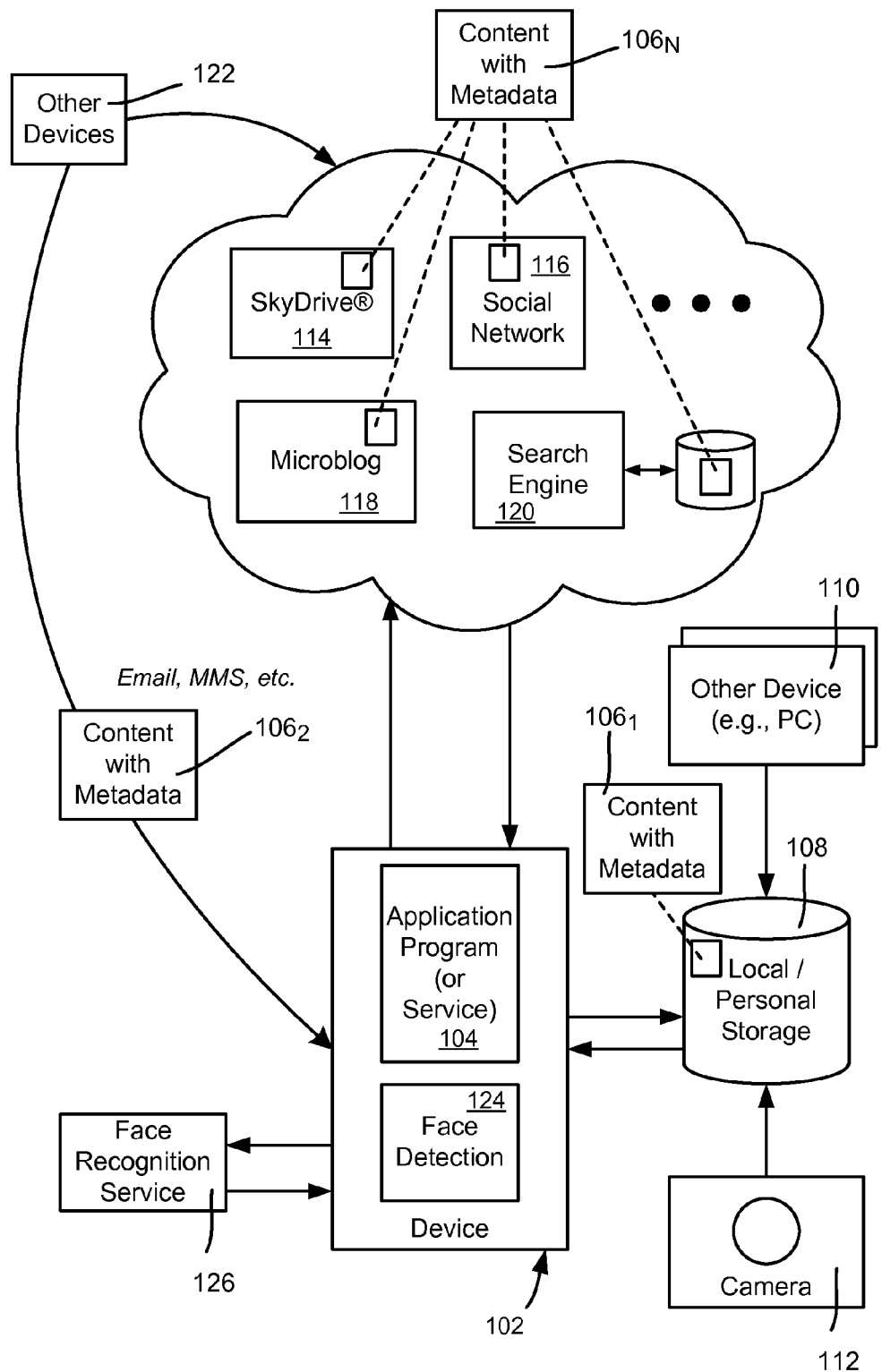
FIG. 1 is a block diagram representing example components in a networked architecture for combining content from various sources based upon matching metadata.

Turning to FIG. 1, there is shown an example computing environment in which a device 102 such as a smartphone runs a program 104 (e.g., an application and/or a service) that is directed towards using photo metadata to link photos. Other devices such as tablets, personal computers and so forth may run a similar program or service.

As represented in FIG. 1, content (e.g., photos) with associated metadata $106_1$-$106_N$ may be maintained on any number of data stores/sources and accessed by the device 102. Example sources and data stores shown in FIG. 1 include local storage/personal storage 108. Local storage may be physically incorporated into the device 102, or coupled thereto such as by USB, Bluetooth®, wireless or wired connections, and so on. "Personal" storage is generally meant that the storage may be remote (e.g., "in the cloud") but reserved to the user/device having appropriate credentials. The device 102 may access photos on the local storage/personal storage 108, and one or more other devices 110 such as a personal computer may store photos onto the local storage. The device may also maintain a metadata database or the like (e.g., in the storage 108) of the metadata for known photos, so as to facilitate efficient matching of related photos. A camera 112 also may provide content, whether directly to storage or via an intermediate device (not shown).

Another source of content ($106_N$) that is represented in FIG. 1 comprises remote sources, including remote storage services such as SkyDrive® 114 (which may be personal and/or shared), a social networking site 116, a microblog site 118, and a search engine 120 with its accompanying photos that are searchable. Other sources may be present, but are not shown in FIG. 1 for purposes of simplicity; a user may use some or all of the depicted sources, as well as any other source of content. Content ($106_2$) may be received from other devices 122, such as corresponding to other users, e.g., via email, MMS or SMS messaging.

With respect to aspects related to the metadata, many digital photos have a timestamp (date and time, or more simply "time") associated with them, which may be one form of associated metadata. Users may also configure their devices, especially smartphones, to associate GPS location data with a photo, and this may be used as another type of metadata. Other types of metadata include person identity data via facial recognition as described herein, as well as concepts such as colors, album name where the content is stored, title, and so forth. Note that as used herein, "matching" metadata does not ordinarily mean exact matching, but a match within appropriate thresholds; e.g., a photograph may match another when it has a timestamp that is within a few hours of the other's, and is within a few miles of the other. Such thresholds may be user configurable, e.g., a weeklong camping trip that spans several miles will likely have different matching thresholds than a party that lasted a few hours and was confined to a specific beach.

Also shown in FIG. 1 is face detection logic 124, which in this example is incorporated into the device 102, but may be a separate program or service. Note that providing local face detection works on local content without the user ever sharing that specific photo to a service, e.g., without the user ever having shared that specific photo with any social networking site. Instead, only detected face-related data may be sent to a face recognition service 126 (or program) to (generally) obtain identity information for each face, which may be used as metadata as described below. In this way, people can be detected even if the user has never personally tagged any friends on this device. The service may have used the tag data from social network contacts to seed the face recognition algorithms More particularly, current technology provides a service 126 or the like that can also recognize people's identity from detected face-related data, whereby the technology described herein may use this identity information as another form of metadata. Locally-detected faces (based on known face detection logic already integrated into a Windows®-based the phone, for example) may be extracted by the logic 124 and recognized by the service 126 or the like that is tied to the users' social graph, for example. Note that earlier models of face recognition were based on seeding the recognition algorithm with local tags; however integrating with a service 126 allows detection for any user who has a rich set of tags already associated with their social graph.

Figure 2:
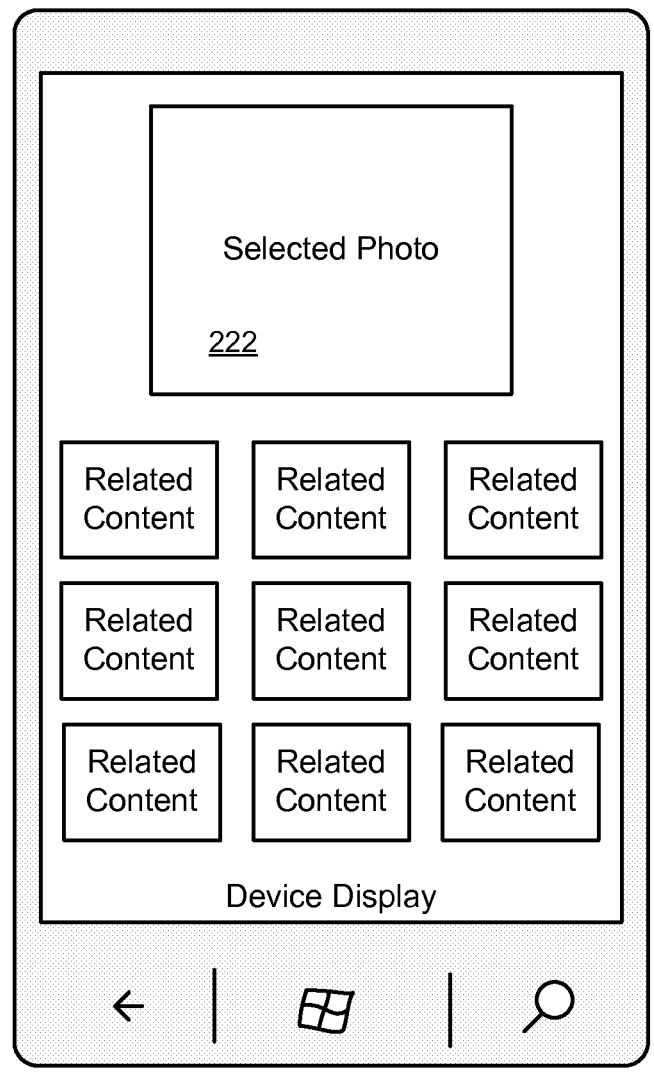
FIG. 2 is a representation of a selected photo being arranged in a view with related content.

FIG. 2 shows one example of how one photo (selected photo 222) may be used as a seed to find and display related content (e.g., other related photos) in a view via associated metadata, including time, location, and/or people identity data. For example, for a selected photo (e.g., one selected from a data source or one that the user has just captured), the application may access the various sources available to it (or may have accessed one or more of the sources previously) in order to obtain and display a set of related content in a suitable view. In this way, related content can be bubbled up, which, for example, lets users branch into experiences of interesting photos and/or other content related by date, time and/or people. Note that unlike an album, the user need not do anything to assemble/collect the set, as the related photo collection is automatically built via matching the metadata. Notwithstanding, the technology described herein remains compatible with known manual user-organizational concepts such as albums and tags; however these existing concepts are not necessary to find related photos. Further, the user may filter via the metadata, e.g., present a view of photos based on matching time and/or location metadata within threshold ranges (but not people identities, for example) between the selected photo 222 and the matched content. Alternatively, people identity data may be used in addition to, or instead of, time and/or location data, to assemble the view of related content.

Turning to aspects related to sharing the experience, via the various sources, an experience may be more than just one photo, or one person's photos (or other content). For example, an event may have had multiple people taking photos, from multiple devices, with that event possibly described in more than one album. Via the metadata, a consistent theme that generally relates such an event is time and location, (and possibly people). For photos that have an associated time and location, the program or local service may arrange this information together in various constructed rich views by plugging into the multiple sources/services (e.g., social network and web). Note that a user may also have shared related photos combined in a view with the user's own related personal photos that are kept private, e.g., those that have not been shared with any social service.

Moreover, in a user's device, the user can be notified when people post related content, such as photos and albums, such as corresponding to a social event that took place. The notifications may be received independent of whether the user has posted any related content. To this end, the metadata (e.g., location and time) of the user's local photos, or any photo currently being viewed, may be used to locate related photos, e.g., by providing the metadata to a service or set of services that plug into the users' social graph and/or the web. If an email or message is received that is accompanied by a photo with associated metadata, for example, the metadata may be processed to find related content and/or to notify the user of the existence of related content. Via the metadata, related content may be found and displayed along with any content posted by other people who were at the event, without the user changing his or her current sharing patterns. In this way, data from local photos/content may be used to construct views/experiences from various services (e.g., web and social network) and other sources.

To summarize thus far, the technology described herein processes the metadata of a photo (whether that photo is local or online), which may include any automatically generated or manually tagged information, to determine matching content. Other metadata based on face detection allows sending face-related data to a service for recognition. This additional information adds "people" identity as metadata, including when manually added tags may not be present. The information may be provided to a service for tags, and a service for location/time to help bring together the related sets. The technology may also pass "Location" data specifically to web services that can retrieve photos from one or more specified locations. In this way, for any photo with some associated metadata, the application is able to assemble related content from sources including the web and social graphs, to help provide numerous content discovery scenarios.

Figure 3:
FIG. 3 is a representation of a camera roll view, containing related content that may be viewed (in whole or in part) on a display.

FIG. 3 exemplifies the concept of a live camera roll showing web and social graph content integrated with camera roll photos. Note that the integrated camera roll may be larger than what the device screen is able to show at any one time, whereby scrolling may be used to access the full view. In the example of FIG. 3, the user may or may not have shared anything explicitly with a service, however the device may have run face detection on the photos and communicated with a service to detect people in the photos from the person's social graph, and may have used the location and time of each photo to help find related content on the web and in the social graph.

In general, with a "live" camera roll, the user only needs to capture photos or video. For example, a photograph that is taken can automatically be cross-referenced with the various sources to expose new and interesting related content.

In the example of FIG. 3, corresponding to the displayed text "Jon was also at the billiards party this day", a social network service found related content (e.g., one or more albums) online based upon a photo that the user has stored locally on the device. A second example in FIG. 3 is "More pictures of Aaron and me", in which the device detected a face in one of the photos, and communicated with a social networking service to have this face recognized. Knowing that "Aaron" was in some of these photos, the program may collect richer and more personal albums or photos based on tag combinations such as "Aaron+Me" albums.

A third example in FIG. 3 shows video from the web being pulled into this experience. In this example, the user had taken a photo at a location that is known to a web service (such as Bing™), and that service related the content to video or photos that are shared on the web, and can be integrated into the user's experience. For example, a user may have taken a photo at a soccer game, and by finding content via matching metadata, is now able to view game footage from the camera roll, such as accessed via an icon next to the image. Another example (not explicitly shown) is that a user may take a picture of the Grand Canyon, and automatically obtain a related panoramic photo obtained via a search engine or service directly in the user's camera roll, for use as if the user took the photo. Note that again, this may be done without the user having to share any photos or videos that the user has captured.

Figure 4:
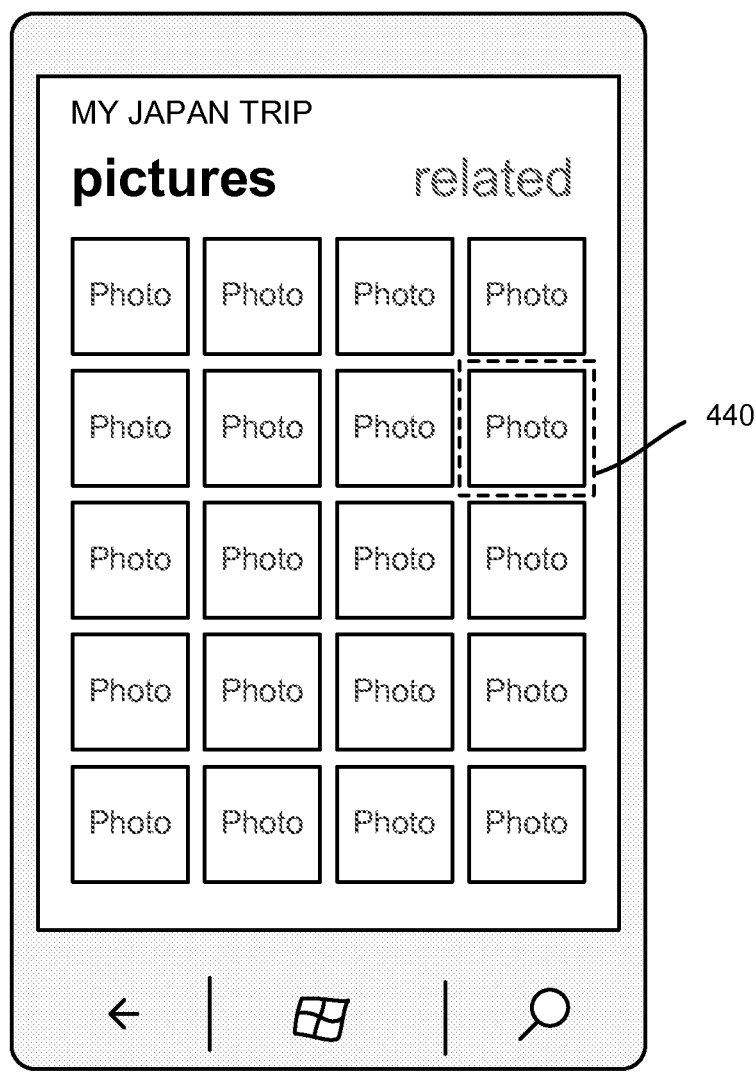
FIG. 4 is a representation of a view containing related content.
Figure 5:
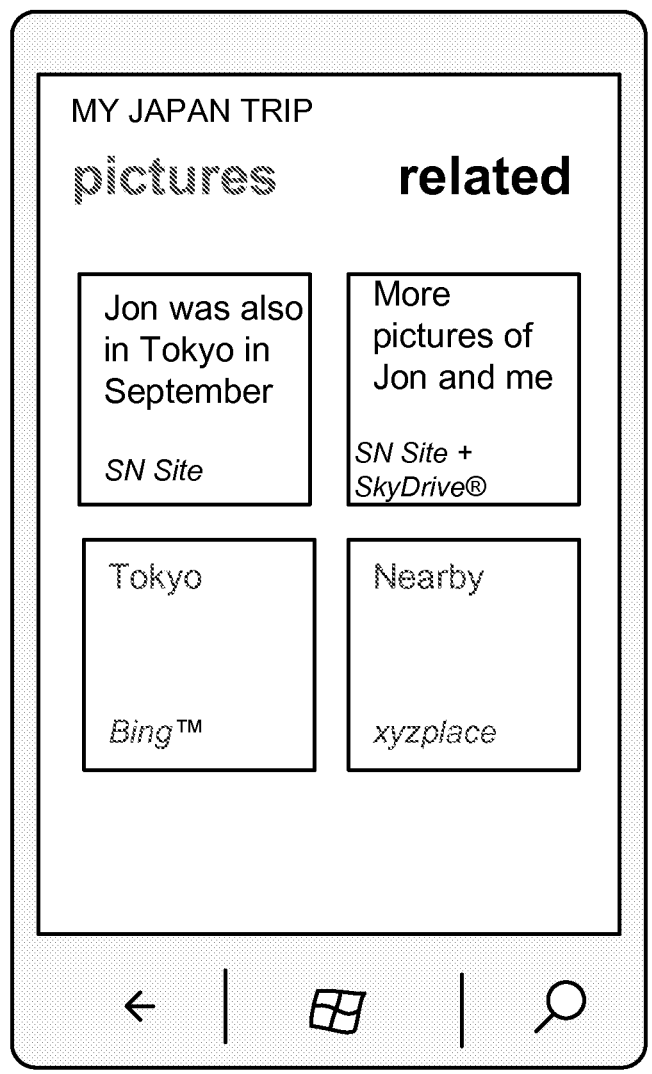
FIG. 5 is a representation of an album (or other collection) view, in which the albums contain metadata-related content.

Turning to FIGS. 4 and 5, similar to the live camera roll, live albums use information (e.g., time, location and/or people identity) gathered from the photos that a user is viewing to assemble new related albums, and/or other content. In FIG. 5, (e.g., corresponding to cursor 440 in FIG. 4), content that may be related by location (Bing™ images from Tokyo, nearby images from a location-based service), content that relates via date and time (Jon was also in Tokyo in September), content related by person (More pictures of Jon and Me) are exemplified. With respect to 'nearby' views, whenever a user views something locally, photos from friends nearby can appear, along with (or instead of) photos taken from this location from any suitable source, including a web cam.

Figure 6:
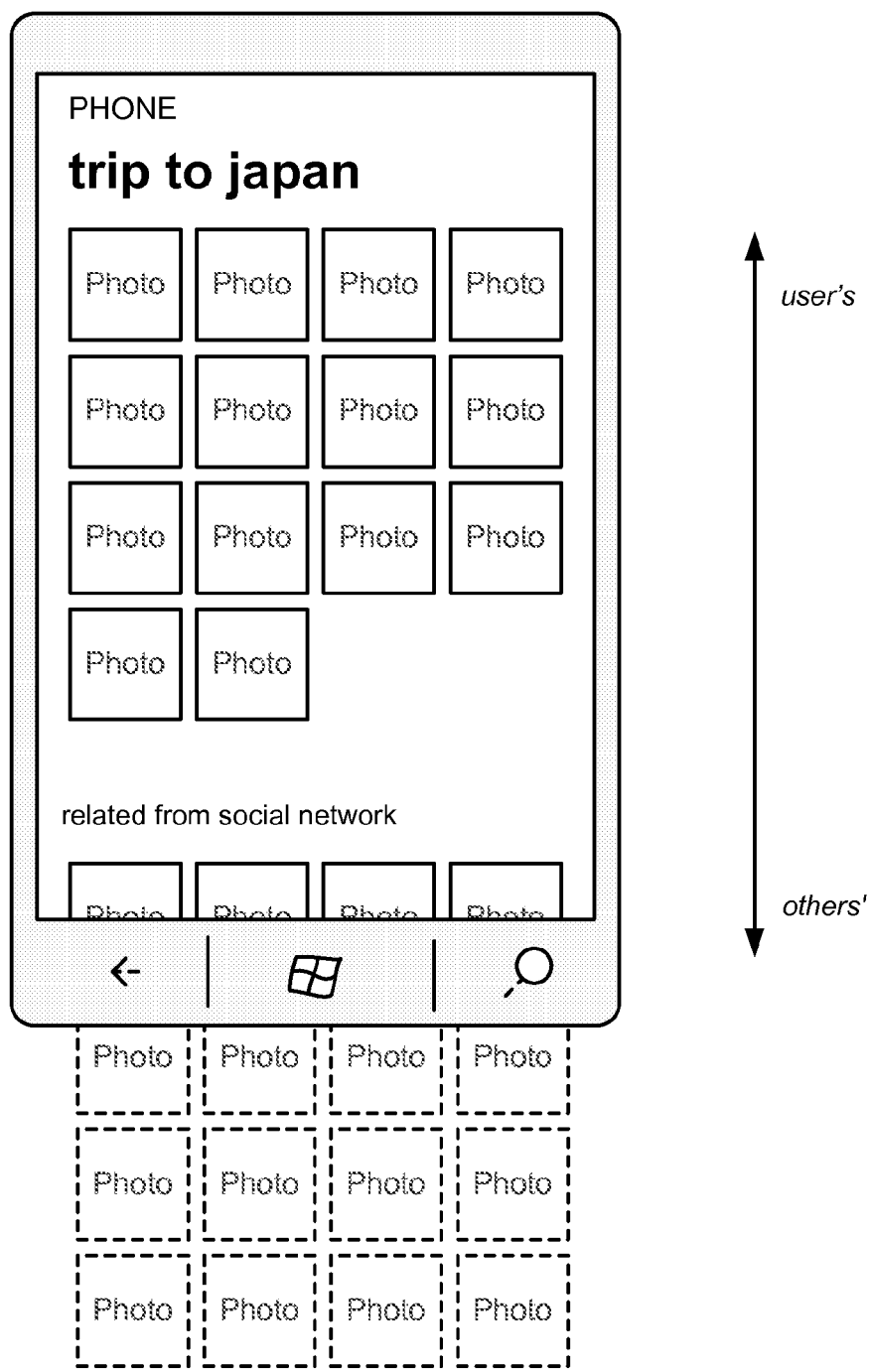
FIG. 6 is a representation of a view containing related sets of content separated by their source.

Further, content may be related by network, or social graph, as represented in FIG. 6. As shown in FIG. 6, the user may scroll to see related social network content (photos in this example) below his or her own photos.

Figure 7:
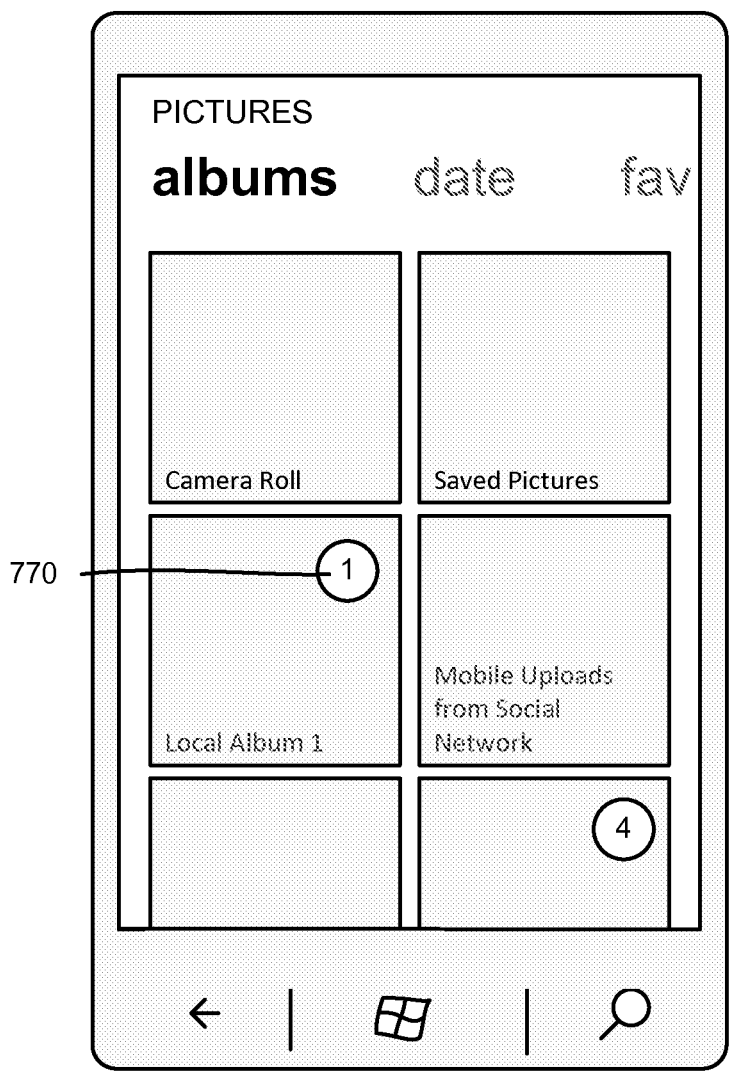
FIG. 7 is a representation of a notification indicating when newly related content has been determined to exist, e.g., by being posted or received.
Figure 8:
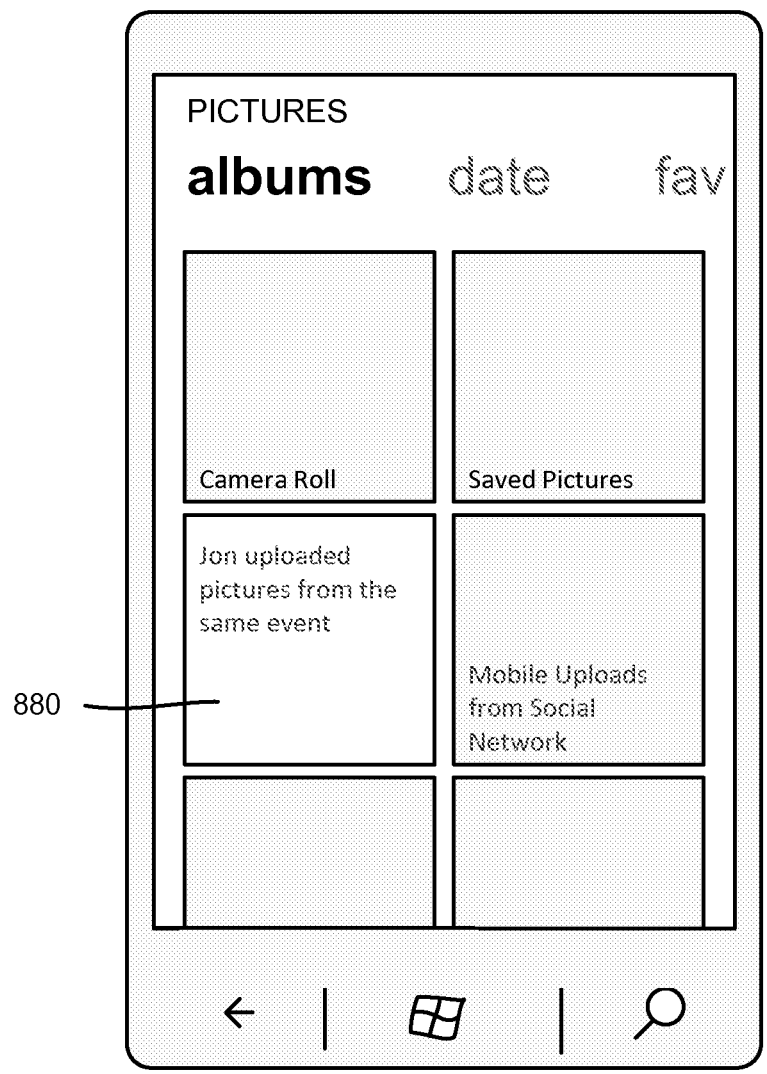
FIG. 8 is a representation of an alternative notification indicating when newly related content has been determined to exist, e.g., by being posted or received.

As represented in FIGS. 7 and 8, the device may be configured to present notifications, including notifications for content related to non-shared content, (whether local or stored online). By way of example, if the camera roll contains a photo from a birthday party last week, and a friend has just posted new photos to her favorite social network site, a notification may appear on the corresponding local album tile, including when the user has not shared that album. The notification may be in the form of a count 770 (FIG. 7) showing the number of such notifications, or in the form of an (e.g., animated) live tile 880 (FIG. 8), showing relevant text in this example.

As described above, photos obtained from other endpoints may be integrated into the experience, such as by scanning received emails that include attachments, and SMS/MMS messages sent with attachments. These received photos or the like are essentially another source of content. The location/time data in these photos, as well as other metadata, can be used in any of the above-exemplified views (as well as others)

such that content from any sharing endpoints (social network, email, MMS, web and so forth) may be included in a given view.

Figure 9:
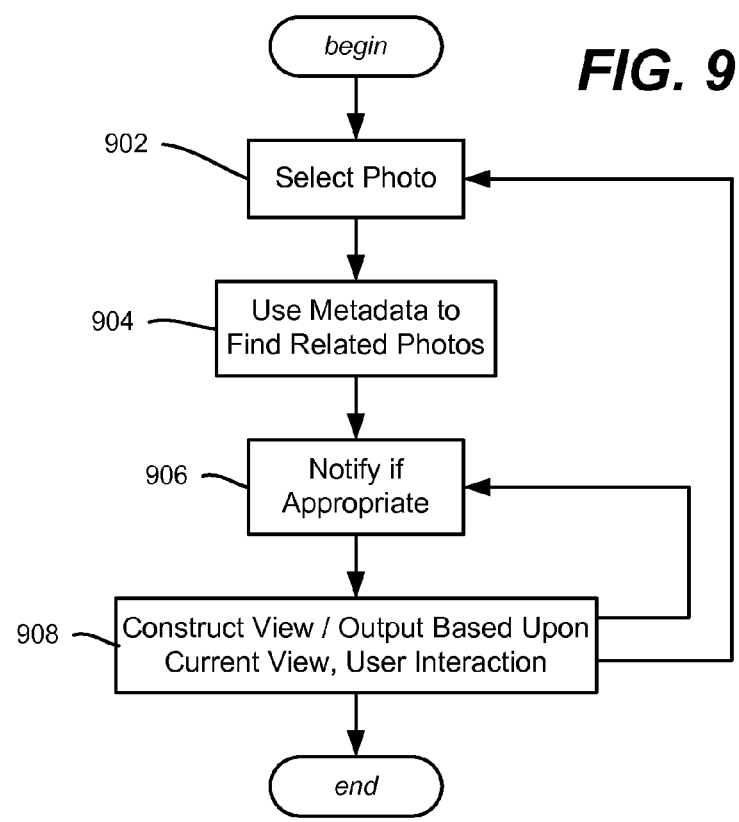
FIG. 9 is a flow diagram representing example steps related to processing selected content to locate and use related content for an integrated view.

FIG. 9 summarizes an example flow diagram scenario in which the program 104 (FIG. 1) actively assembles a view of photos and other content based upon a selected photo (step 902). At step 904, the program 104 uses the metadata accompanying the photo to find related content. Note that the program 104 may also take action to have some of the metadata generated if desired, e.g., the program 104 may request face detection followed by face recognition to obtain additional metadata if not present with the selected photo.

Step 906 represents notification if appropriate. For example, consider that the program 104 (FIG. 1) is not displaying a photo, but rather running (e.g., in the background or as a service) to scan an email or an SMS/MMS message. If an attachment comprises a photo, the application may decide that a notification is appropriate based on the photo's metadata, and take action (e.g., call the operating system) to output a notification. Similarly, the program may be running, such as during device idle or low usage times, to cache photos (pushed or pulled) from the various sources and thereby facilitate faster operation. A newly found related photo may cause such a notification.

Step 908 represents displaying a view as appropriate, such as if the user is actively interacting with the application to view the photos and related content. The user may interact to select different photos (return to step 902), change views (which may result in a visible notification output at step 906), play a video and so forth as generally described above.

Figure 10:
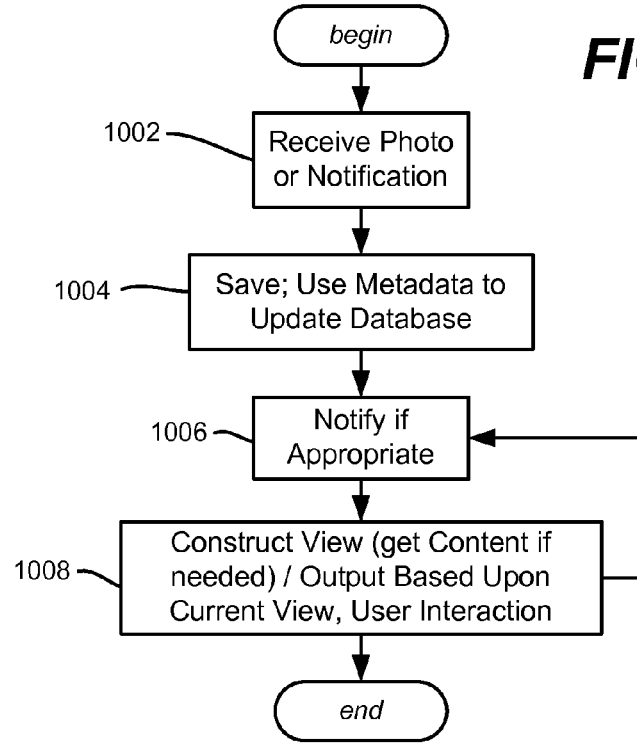
FIG. 10 is a flow diagram representing example steps related to processing received content or a notification.

FIG. 10 is generally directed to example steps related to actions that occur when a new photo or notification is received (step 1002), such as pushed or sent to the device. Depending on what information is available, the program 104 (FIG. 1) may save the data (e.g., save the photo as a file, or notification-related data) and update its metadata database at step 1004 so as to track how the new content is related to existing photos. As before, notification (step 1006) may or may not be appropriate at this time, depending on how the phone is configured and what is being displayed at the moment. Step 1008 represents changing the current view when appropriate, e.g., to show a newly received photo in the camera roll if the camera roll or another suitable view is being presented on the display.

As can be seen, there is provided a technology that uses metadata for integrating local photos in a native phone experience (e.g., the camera roll, local albums) with other content such as web content and social graph content, as well as email, SMS/MMS-shared content. Notifications may be made to appear, such as in tiles or pop-ups, to reflect when new remote content that is related to local albums and photos has been posted or received, even without the user sharing any local data. Detected faces may be sent to a face recognition service to enable recognition on a photo without ever sharing the photo with a social networking service.

Exemplary Operating Environment

Figure 11:
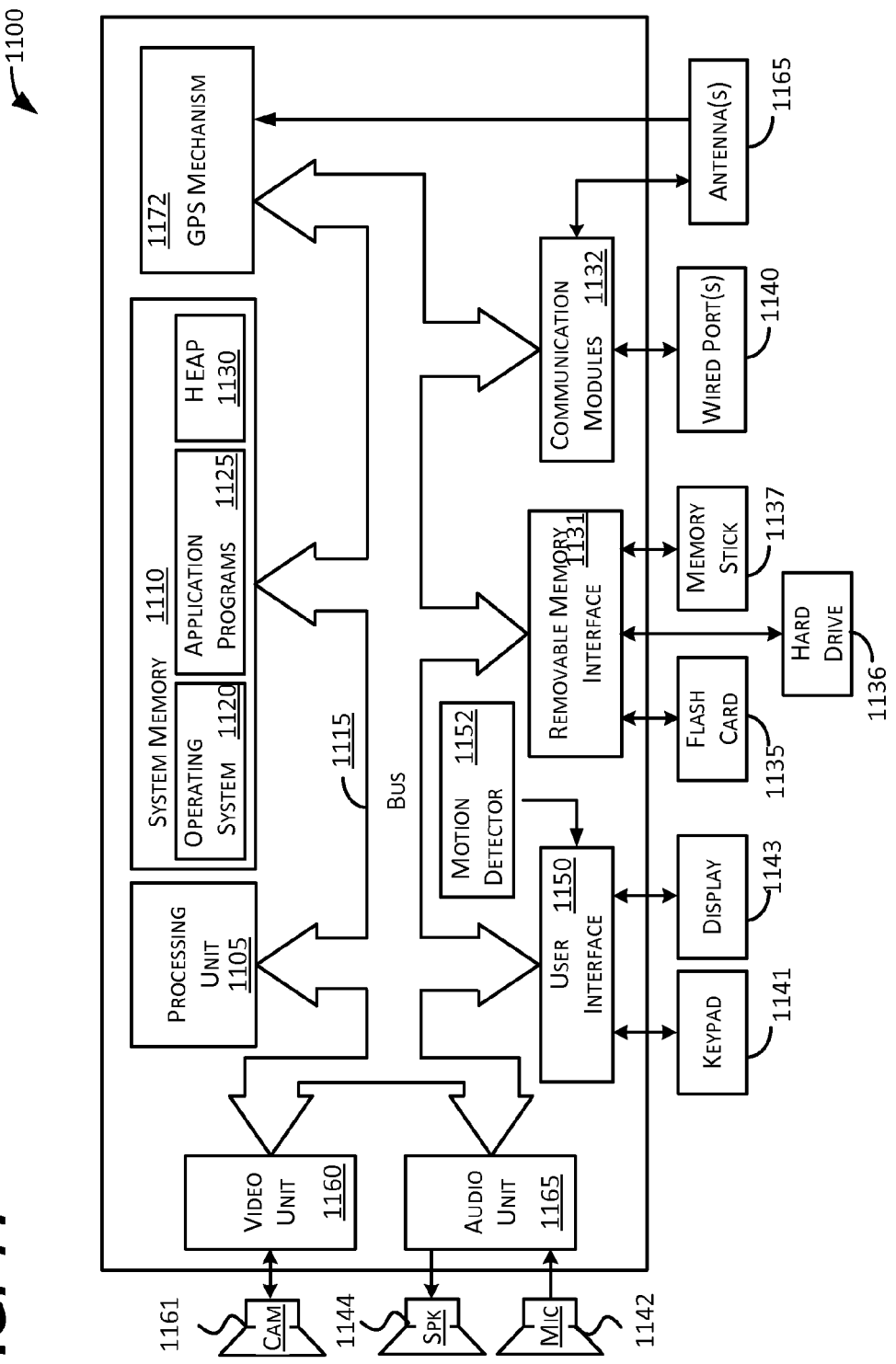
FIG. 11 is a block diagram representing an exemplary non-limiting computing system or operating environment, e.g., in the example of a mobile phone device, in which one or more aspects of various embodiments described herein can be implemented.

FIG. 11 illustrates an example of a suitable mobile device 1100 on which aspects of the subject matter described herein may be implemented. The mobile device 1100 is only one example of a device and is not intended to suggest any limitation as to the scope of use or functionality of aspects of the subject matter described herein. Neither should the mobile device 1100 be interpreted as having any dependency or requirement relating to any one or combination of components illustrated in the exemplary mobile device 1100.

With reference to FIG. 11, an exemplary device for implementing aspects of the subject matter described herein includes a mobile device 1100. In some embodiments, the mobile device 1100 comprises a cell phone, a handheld device that allows voice communications with others, some other voice communications device, or the like. In these embodiments, the mobile device 1100 may be equipped with a camera for taking pictures, although this may not be required in other embodiments. In other embodiments, the mobile device 1100 may comprise a personal digital assistant (PDA), hand-held gaming device, notebook computer, printer, appliance including a set-top, media center, or other appliance, other mobile devices, or the like. In yet other embodiments, the mobile device 1100 may comprise devices that are generally considered non-mobile such as personal computers, servers, or the like.

Components of the mobile device 1100 may include, but are not limited to, a processing unit 1105, system memory 1110, and a bus 1115 that couples various system components including the system memory 1110 to the processing unit 1105. The bus 1115 may include any of several types of bus structures including a memory bus, memory controller, a peripheral bus, and a local bus using any of a variety of bus architectures, and the like. The bus 1115 allows data to be transmitted between various components of the mobile device 1100.

The mobile device 1100 may include a variety of computer-readable media. Computer-readable media can be any available media that can be accessed by the mobile device 1100 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the mobile device 1100.

Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, Bluetooth®, Wireless USB, infrared, WiFi, WiMAX, and other wireless media. Combinations of any of the above should also be included within the scope of computer-readable media.

The system memory 1110 includes computer storage media in the form of volatile and/or nonvolatile memory and may include read only memory (ROM) and random access memory (RAM). On a mobile device such as a cell phone, operating system code 1120 is sometimes included in ROM although, in other embodiments, this is not required. Similarly, application programs 1125 are often placed in RAM although again, in other embodiments, application programs may be placed in ROM or in other computer-readable memory. The heap 1130 provides memory for state associated with the operating system 1120 and the application programs 1125. For example, the operating system 1120 and application programs 1125 may store variables and data structures in the heap 1130 during their operations.

The mobile device 1100 may also include other removable/non-removable, volatile/nonvolatile memory. By way of example, FIG. 11 illustrates a flash card 1135, a hard disk drive 1136, and a memory stick 1137. The hard disk drive 1136 may be miniaturized to fit in a memory slot, for example. The mobile device 1100 may interface with these types of non-volatile removable memory via a removable memory interface 1131, or may be connected via a universal serial bus (USB), IEEE 11394, one or more of the wired port(s) 1140, or antenna(s) 1165. In these embodiments, the removable memory devices 1135-1137 may interface with the mobile device via the communications module(s) 1132. In some embodiments, not all of these types of memory may be included on a single mobile device. In other embodiments, one or more of these and other types of removable memory may be included on a single mobile device.

In some embodiments, the hard disk drive 1136 may be connected in such a way as to be more permanently attached to the mobile device 1100. For example, the hard disk drive 1136 may be connected to an interface such as parallel advanced technology attachment (PATA), serial advanced technology attachment (SATA) or otherwise, which may be connected to the bus 1115. In such embodiments, removing the hard drive may involve removing a cover of the mobile device 1100 and removing screws or other fasteners that connect the hard drive 1136 to support structures within the mobile device 1100.

The removable memory devices 1135-1137 and their associated computer storage media, discussed above and illustrated in FIG. 11, provide storage of computer-readable instructions, program modules, data structures, and other data for the mobile device 1100. For example, the removable memory device or devices 1135-1137 may store images taken by the mobile device 1100, voice recordings, contact information, programs, data for the programs and so forth.

A user may enter commands and information into the mobile device 1100 through input devices such as a key pad 1141 and the microphone 1142. In some embodiments, the display 1143 may be touch-sensitive screen and may allow a user to enter commands and information thereon. The key pad 1141 and display 1143 may be connected to the processing unit 1105 through a user input interface 1150 that is coupled to the bus 1115, but may also be connected by other interface and bus structures, such as the communications module(s) 1132 and wired port(s) 1140. Motion detection 1152 can be used to determine gestures made with the device 1100.

A user may communicate with other users via speaking into the microphone 1142 and via text messages that are entered on the key pad 1141 or a touch sensitive display 1143, for example. The audio unit 1155 may provide electrical signals to drive the speaker 1144 as well as receive and digitize audio signals received from the microphone 1142.

The mobile device 1100 may include a video unit 1160 that provides signals to drive a camera 1161. The video unit 1160 may also receive images obtained by the camera 1161 and provide these images to the processing unit 1105 and/or memory included on the mobile device 1100. The images obtained by the camera 1161 may comprise video, one or more images that do not form a video, or some combination thereof.

The communication module(s) 1132 may provide signals to and receive signals from one or more antenna(s) 1165. One of the antenna(s) 1165 may transmit and receive messages for a cell phone network. Another antenna may transmit and receive Bluetooth® messages. Yet another antenna (or a shared antenna) may transmit and receive network messages via a wireless Ethernet network standard.

Still further, an antenna provides location-based information, e.g., GPS signals to a GPS interface and mechanism 1172. In turn, the GPS mechanism 1172 makes available the corresponding GPS data (e.g., time and coordinates) for processing.

In some embodiments, a single antenna may be used to transmit and/or receive messages for more than one type of network. For example, a single antenna may transmit and receive voice and packet messages.

When operated in a networked environment, the mobile device 1100 may connect to one or more remote devices. The remote devices may include a personal computer, a server, a router, a network PC, a cell phone, a media playback device, a peer device or other common network node, and typically includes many or all of the elements described above relative to the mobile device 1100.

Aspects of the subject matter described herein are operational with numerous other general purpose or special purpose computing system environments or configurations. Examples of well known computing systems, environments, and/or configurations that may be suitable for use with aspects of the subject matter described herein include, but are not limited to, personal computers, server computers, hand-held or laptop devices, multiprocessor systems, microcontroller-based systems, set top boxes, programmable consumer electronics, network PCs, minicomputers, mainframe computers, distributed computing environments that include any of the above systems or devices, and the like.

Aspects of the subject matter described herein may be described in the general context of computer-executable instructions, such as program modules, being executed by a mobile device. Generally, program modules include routines, programs, objects, components, data structures, and so forth, which perform particular tasks or implement particular abstract data types. Aspects of the subject matter described herein may also be practiced in distributed computing environments where tasks are performed by remote processing devices that are linked through a communications network. In a distributed computing environment, program modules may be located in both local and remote computer storage media including memory storage devices.

Furthermore, although the term server may be used herein, it will be recognized that this term may also encompass a client, a set of one or more processes distributed on one or more computers, one or more stand-alone storage devices, a set of one or more other devices, a combination of one or more of the above, and the like.

CONCLUSION

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. In a computing environment, a method performed at least in part on at least one processor, comprising:

matching content metadata associated with content with other content metadata associated with other content maintained at a plurality of sources to automatically locate other content related to the content, wherein the content comprises a local photograph that is maintained on a device storage and further comprising accessing the other content from at least one remote source by initially matching the other content metadata to the content metadata; and constructing an integrated view that presents the other content in conjunction with the content.

2. The method of claim 1 wherein at least some of the content metadata comprises automatically generated metadata, and includes time, location or identity data, or any combination of time, location or identity data.

3. The method of claim 1 wherein matching the content metadata associated with the content with the other content metadata associated with the other content maintained at the plurality of sources further comprises:

setting a threshold range to determine whether the content metadata matches the other content metadata associated with the other content; and determining whether the threshold range is met.

4. The method of claim 1 wherein matching the content metadata comprises matching time, location or identity metadata, or any combination of time, location or identity data, with the other content metadata.

5. The method of claim 1 further comprising, obtaining identity metadata corresponding to at least one person in the content, including providing the content to a face detection mechanism to obtain face-related data, and providing the face-related data to a recognition service.

6. The method of claim 1 further comprising, taking action to output a notification with respect to local content when new related content is determined to exist.

7. The method of claim 6 wherein the notification with respect to the local content corresponds to information that appears on an album to indicate that the album contains or is linked to the new related content.

8. The method of claim 1 wherein constructing the integrated view comprises assembling a camera roll containing one or more photos that are each related to one another via matching metadata, or one or more components that are each representative of a video or collection of content related to the one or more photos via matching metadata, or a combination of one or more photos and one or more components that are each representative of a video or collection of content related to the one or more photos via matching metadata.

9. A system comprising, a device configured to automatically relate a first set of content from one source with a second set of content obtained from at least one other source, including by using metadata that is associated with the first set of content to determine which other accessible content to select as the second set of content by being related to the first set of content according to the metadata, the device further configured to present an integrated view of the first set of content and the second set of content for viewing or interaction, or both viewing and interaction.

10. The system of claim 9 wherein the metadata comprises time information, location information, identity information, tag information or album information, or any combination of time information, location information, identity data, tag information or album information.

11. The system of claim 9 wherein the second set of content is obtained via a social network source, or a web source, or both.

12. The system of claim 9 wherein the second set of content is obtained as an attachment of a message received at the device, including an email message, an MMS message, or any other message format.

13. The system of claim 9 wherein the metadata further includes identity metadata obtained via face detection and a face recognition service.

14. The system of claim 9 wherein the device is further configured to output a notification of newly detected related content.

15. The system of claim 14 wherein the notification comprises an indicator or text that appears on a tile or other icon representative of the first set of content.

16. The system of claim 9 wherein the integrated view comprises a camera roll view, an album view, or a view that separates the first set of content from the second set of content for display.

17. The system of claim 9 wherein the device comprises a phone, a tablet or a personal computer, and wherein the device runs a program or service to automatically relate the first set of content with the second set of content.

18. One or more computer storage devices having computer-executable instructions, which when executed perform steps, comprising:

accessing at least one remote source to locate a set of related content that is related to a selected photograph based upon matching metadata of the photograph with corresponding metadata of the content, in which the metadata includes time information, location information, identity information, tag information, album information or any combination of time information, location information, identity information, tag information, album information;

automatically combining the photograph and the set of related content into a view; and displaying the view on a device screen for user interaction therewith.

19. The one or more computer storage devices of claim 18 having further computer-executable instructions comprising, outputting a notification indicative of new related content.

20. The one or more computer storage devices of claim 18 having further computer-executable instructions comprising, processing the photograph to obtain face-related data useable for face recognition, and using the face-related data to obtain the identity information.

* * * * *